Sept. 25, 1951  O. C. MARTIN  2,569,014
VALVE CONSTRUCTION
Filed June 3, 1946  9 Sheets-Sheet 1

INVENTOR.
OTIS C. MARTIN,
deceased
BY MARION E. MARTIN,
Administratrix
ATTORNEY.

Sept. 25, 1951  O. C. MARTIN  2,569,014
VALVE CONSTRUCTION

Filed June 3, 1946  9 Sheets-Sheet 2

INVENTOR.
OTIS C. MARTIN, deceased
BY MARION E. MARTIN, Administratrix
ATTORNEY.

Sept. 25, 1951  O. C. MARTIN  2,569,014
VALVE CONSTRUCTION
Filed June 3, 1946  9 Sheets-Sheet 3

INVENTOR.
OTIS C. MARTIN,
deceased
BY MARION E. MARTIN,
Administratrix
ATTORNEY.

Sept. 25, 1951     O. C. MARTIN     2,569,014
VALVE CONSTRUCTION Filed June 3, 1946                                                           9 Sheets-Sheet 4

Fig. 9.

INVENTOR.
OTIS C. MARTIN,
deceased
BY MARION E. MARTIN,
Administratrix

ATTORNEY.

Sept. 25, 1951 O. C. MARTIN 2,569,014
VALVE CONSTRUCTION
Filed June 3, 1946 9 Sheets-Sheet 5

INVENTOR.
OTIS C. MARTIN,
deceased
BY MARION E. MARTIN,
Administratrix
ATTORNEY.

Sept. 25, 1951     O. C. MARTIN     2,569,014
VALVE CONSTRUCTION Filed June 3, 1946     9 Sheets—Sheet 6

INVENTOR.
OTIS C. MARTIN, deceased
BY MARION E. MARTIN
Administratrix
ATTORNEY.

Sept. 25, 1951     O. C. MARTIN     2,569,014
VALVE CONSTRUCTION Filed June 3, 1946     9 Sheets-Sheet 7

INVENTOR.
OTIS C. MARTIN,
deceased
BY MARION E. MARTIN,
Administratrix

ATTORNEY.

Sept. 25, 1951      O. C. MARTIN      2,569,014
VALVE CONSTRUCTION Filed June 3, 1946      9 Sheets-Sheet 8

INVENTOR.
OTIS C. MARTIN,
deceased
BY MARION E. MARTIN,
Administratrix
ATTORNEY.

Sept. 25, 1951     O. C. MARTIN     2,569,014
VALVE CONSTRUCTION Filed June 3, 1946     9 Sheets-Sheet 9

INVENTOR.
OTIS C. MARTIN,
deceased
BY MARION E. MARTIN,
Administratrix
ATTORNEY.

Patented Sept. 25, 1951

2,569,014

UNITED STATES PATENT OFFICE 2,569,014

VALVE CONSTRUCTION

Otis C. Martin, deceased, late of Los Angeles, Calif., by Marion E. Martin, administratrix, Los Angeles, Calif., assignor to Harry Nock, Elizabeth, N. J.

Application June 3, 1946, Serial No. 674,027

6 Claims. (Cl. 137—144)

This invention relates to valve constructions and has particular reference to a valve structure of relatively small size and weight, particularly adapted for the control of flow of fluids in either pneumatic or hydraulic control apparatus where space limitations and weight limitations are of importance.

In many hydraulic or pneumatic control systems, for example, on aircraft, the control valves to be employed must occupy a minimum amount of space and must be of as little weight as possible and yet be capable of controlling high rates of flow and relatively high pressures. In addition to these requirements, it frequently becomes necessary to provide actuating apparatus for the valves which are to be located remote from the location of the valve itself or the controls for the valves must be capable of being operated from two different relatively spaced locations.

It is therefore an object of this invention to provide a valve construction in which the fluid to be controlled is controlled directly by main valves which are in turn actuated by pilot valves permitting a minute amount of motion of a pilot valve to control a relatively great amount of movement of a main valve to thereby permit relatively large volumetric flow through the main valve.

Another object of this invention is to provide a valve construction as set forth in which the pilot valve or valves may be actuated manually at the valve location or may be actuated either hydraulically or electrically from remote locations.

Another object of the present invention is to provide a valve construction of the character set forth, in which a single valve unit may be provided with a multiplicity of control apparatus, permitting operation of the valves from any one of a plurality of locations.

Another object of the present invention is to provide a construction wherein a single valve unit comprising main valves and pilot valves for actuating the main valves may be readily adapted for different types of control actuation by the mere addition to the valve unit of a control unit containing the selected type of operating apparatus.

Another object of this invention is to provide a construction as set forth in the preceding paragraph, wherein the control unit to be employed with the valve unit may be a manually operated unit, a magnetically operated unit or a fluid operated unit, or may contain any selected combination of such types of operators.

Another object of this invention is to provide a valve construction wherein a single valve body containing valve bores may be employed to accomplish 2-way, 3-way or 4-way control by merely selecting the main valves and pilot valves to be used in the assembly.

Another object of this invention is to provide a construction of the character set forth wherein the structure may be manufactured with a minimum of complicated machining operations.

Other objects and advantages of this invention will be apparent from a study of the following specifications, read in connection with the accompanying drawings, wherein.

Figure 1:
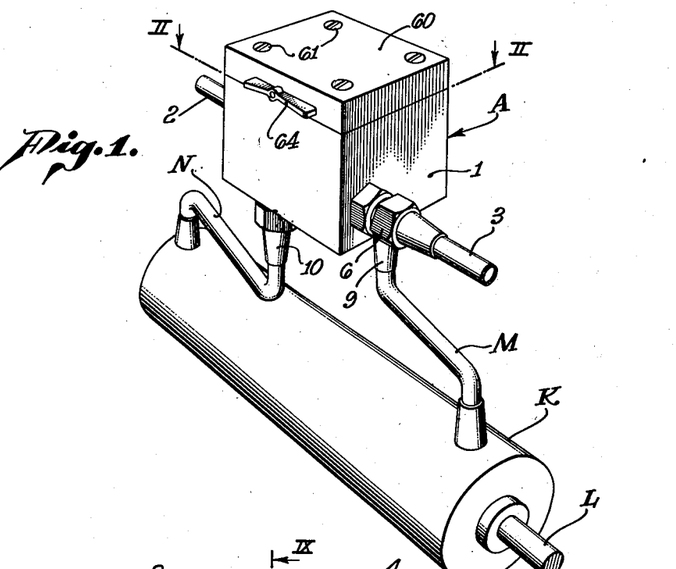
Fig. 1 is a perspective view of a valve constructed in accordance with this invention adapted as a 4-way valve to control the operations of a cylinder and piston mechanism with which it may be associated.

Referring to the drawings, there is illustrated in Fig. 1 a simple adaptation of the valve to a hydraulic control problem wherein the valve unit designated generally by the reference character A is associated with a hydraulic control cylinder K, the piston of which (not shown) is coupled to a piston rod L which is adapted to be reciprocated relative to the cylinder K by the flow of fluid in either of two directions, namely, through a pipe M into one end of the cylinder, while fluid is exhausted from the other end of the cylinder through a pipe N or vice versa.

The valve structure as illustrated in Fig. 1 comprises a valve body I containing the various main and pilot valves required to cause the fluid to flow in the desired direction through the pipes M and N and which in the form illustrated is a 4-way valve unit wherein pressure from a suitable pressure source is admitted into the valve unit I through a pipe 2 while fluid from the system is either exhausted or is directed to a fluid return line through a pipe 3.

By referring particularly to Figs. 1 through 6, it will be observed that the valve body I comprises a substantially cubical block of metal, into one end of which extends a pressure receiving port 4, to which the pressure supply pipe 2 may be coupled by means of any suitable tube or pipe fitting well known in this art. For convenience of illustration, the pipe lines are illustrated as smooth-ended metal tubes of the type commonly employed in the hydraulic systems of aircraft while the fittings or couplings employed are illustrated as the conventional tube fittings employed in aircraft hydraulic lines.

The valve body I is also provided upon its opposite end with a return port 5, which as illustrated in Fig. 1 is coupled by means of a suitable fitting 6 to the exhaust or return pipe or tube 3. From the under side or bottom of the body I there extends two ports 7 and 8 which may be referred to as the cylinder ports, the port 7 being connected by means of a fitting 9 to the pipe M leading to one end of the cylinder K while the port 8 is connected by means of a fitting 10 to the pipe N communicating with the opposite end of the cylinder K.

Figure 2:
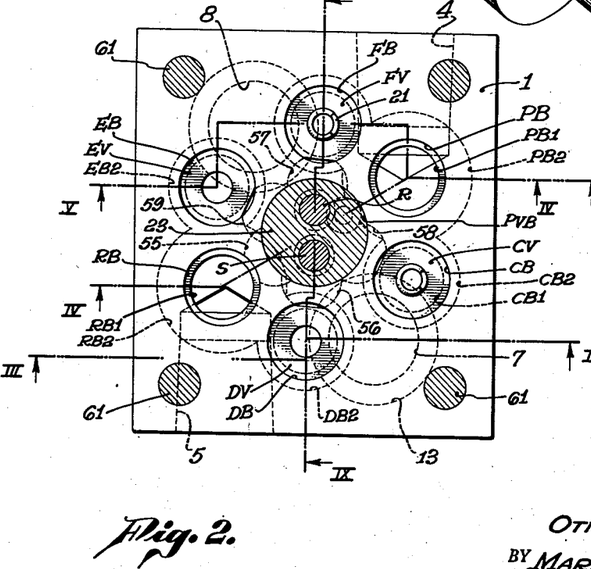
Fig. 2 is a horizontal sectional view taken along the plane II—II of Fig. 1.
Figure 3:
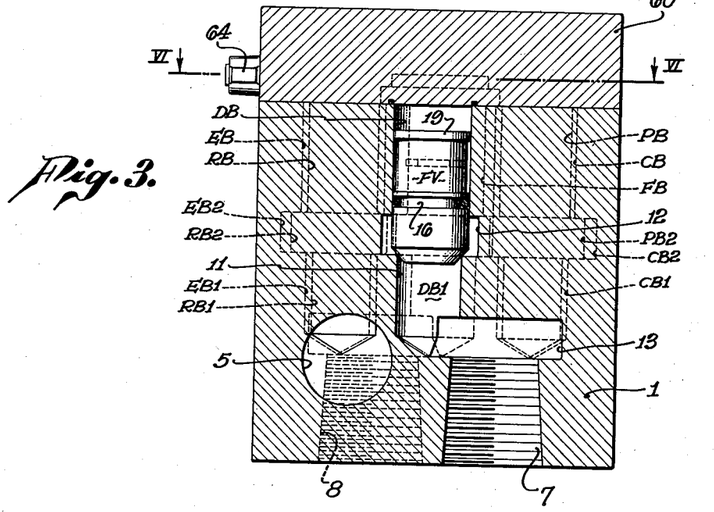
Fig. 3 is a vertical sectional view taken along the line III—III of Fig. 2.

By referring particularly to Fig. 2, it will be observed that from the top surface of the body I there extend six identical bores PB, RB, CB, DB, EB and FB, said bores extending from the upper surface of the body I as a bore of one diameter with a continuation of each of the bores at a lesser diameter as indicated in Fig. 3 at 11. Each of the bores, however, is provided between its larger and lesser diameter portions with enlargements, one of which is indicated at 12 in Fig. 3, causing that particular bore to be intercommunicated with others of the bores, as will be more fully hereinafter described.

Likewise the lower ends of each of the bores communicate with certain of the ports 4, 5, 7 and 8, respectively, through the medium of enlargements of the bores comprising these ports, one of which is indicated at 13 in Fig. 3, so that each of the several bores FB, PB, CB, DB, EB and RB is properly communicated with the ports necessary to permit the flow of fluid from the pressure line in one direction to the cylinder K or in the other direction to the cylinder K while the return fluid from the cylinder K is properly directed to the return line 3.

Again referring to Figs. 2 through 5, the intercommunication of the various bores PB, RB, etc. is as follows: The bore PB communicates at all times with the pressure inlet port 4, by reason of the intersection of the downwardly extending reduced portion PB1 of the pressure bore with the inner end of the pressure port bore 4 which, as pointed out before, extends from the rear face of the body I and, as illustrated, the outer portion of the pressure port 4 is formed as a tapered threaded bore for the reception of the tapered threaded tube fitting required to connect the pipe 2 thereto. Thus the pressure bore PB is at all times filled with the fluid (which for purposes of the following description will be assumed to be a hydraulic fluid or liquid) and at the pressure of the supply system which supplies pressure fluid for the operation of the piston and cylinder mechanism K. The pressure bore PB likewise communicates with the two adjacent valve bores CB and FB, this intercommunication being accomplished by enlarging one or both of these bores until the enlargements intersect each other sufficiently to provide a relatively large fluid passage therebetween. As illustrated in Figs. 1 through 5 and 9, both of the adjacent bores are provided with enlargements though it will be understood by those skilled in this art that the pressure bore PB alone may be provided with a sufficient enlargement to intersect the larger diameter portions of the adjacent bores CB and FB.

Similarly the return bore RB communicates with the return port 5 by reason of the intersection of the vertically extending reduced diameter portion RB1 with the laterally extending return port bore 5 which, like the pressure port 4, has its outermost portion formed with a tapered thread to receive the tapered threaded tube fitting 6. Also the return bore RB is intercommunicated with the adjacent valve bores EB and DB by reason of the enlargements RB2 with corresponding enlargements of the adjacent bores EB and DB, as indicated particularly in Fig. 3, and which from the standpoint of construction of the valve body is a duplication of the arrangement shown in Fig. 5 for the pressure bore PB merely reversed. Thus at all times the return bore RB is open to the exhaust or return line 3.

The valve bores CB and DB are at all times in communication with the cylinder port 7 to which the fitting 9 and pipe M are connected, the communication being established by reason of the disposition of the vertical axis of the cylinder port 7 approximately midway between the vertical axes of the adjacent bores CB and DB and having at least a portion of the port bore 7 of sufficient diameter, as indicated at 13 in Fig. 3, to intersect the reduced diameter portions CB1 and DB1 of the corresponding valve bores.

As illustrated particularly in Fig. 3, the cylinder port bore 7 extends from the underneath surface of the body 1 as a tapered threaded bore adapted to receive the fitting 9 but the innermost end of the bore 7 is enlarged as indicated at 13 to achieve the intercommunication just described.

Correspondingly, the cylinder bore 8 intercommunicates at all times with the reduced diameter portions of the valve bores FB and EB by reason of the enlargement of the inner end of the cylinder port bore 8.

It will be observed from the foregoing description that the construction of the entire body 1 with its various bores PB, RB, CB, DB, EB, FB and their enlargements and the ports 4, 5, 7 and 8 with their enlargements necessary to achieve the above described intercommunication between the various bores, may be readily accomplished by extremely simple machining operations, the entire body being readily formed upon a simple engine lathe or turret lathe equipped with indexing mechanism for centering the various bores, drilling tools to drill the various bores, undercutting tools to undercut the enlargements and threading mechanisms to thread the ports 4, 5, 7 and 8.

With the construction thus far described it will be apparent that with main valves in the valve bores CB, DB, FB and EB adapted to be normally closed, the fluid pressure entering the valve through the port 4 and being distributed from the pressure bore PB will be prevented by the valves in the valve bores SB and FB from passing into either of the cylinder ports 7 and 8 while, though the return bore RB is open to the return line 3, the valves in the valve bores DB and EB will prevent the passage of fluid from the cylinder K to the return bore RB and its associated return port 5. Thus the bores PB and RB are not provided with valves and serve instead as fluid distributors.

The construction of the valves in the valve bores is illustrated particularly in Figs. 2, 3, 5 and 9, it being understood that each of these valves is identical with the other so as to facilitate the assembly of the valve units and the ready replacement of any of these valves merely by substituting a new identical part. Therefore for purposes of convenience in this description, that particular main valve which is associated with each bore will be identified with the bore in which it is located, the main valve in the bore CB bearing the number CV, the valve DV being located in the bore DB, the valve EV being located in the bore EB, and the valve FV being located in the bore FB. Thus but a single one of these main valves need be described.

Figures 5, 8:
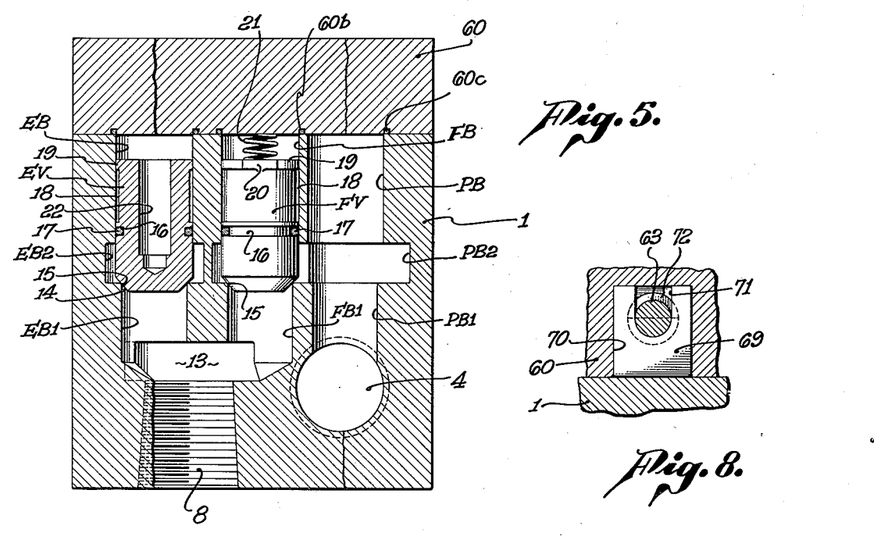
Fig. 5 is a vertical sectional view taken along the line V—V of Fig. 2.
Fig. 8 is a vertical sectional view through the cap and handle structure taken along line VIII—VIII of Fig. 7.

Referring particularly to Figs. 2 and 5, it will be observed that each of the main valves EV, FV is formed as a cylindrical piece of metal, the lower end of which is preferably chamfered as indicated at 14 to form a beveled seating surface adapted to seat upon the shoulder 15 formed at the junction of the upper large diameter portion of the associated valve bore, for example EB, and the lower small diameter portion EB1.

Thus the chamfered valve end forms its own valve seat in its particular bore and any wear which may be occasioned by the operation of the main valve will merely increase the area of contact between the main valve and its seating surface in the body 1. Spaced upwardly from the chamfered portion 14 of the main valve in an annular groove 16 in which is seated an annular packing ring 17 preferably formed of neoprene of the "donut" type, that is, the packing ring comprises an annulus of circular cross-sectioned material having a cross sectional diameter just slightly in excess of the depth of the groove 16 to form a seal between the upper large diameter portion of the valve bore, for example EB, and the valve EV. The vertical distance between the chamfered end 14 and the groove 16 is such that when the valve EV is upon its seat 15, the packing ring 17 will be disposed in the upper portion of the valve bore EB above the enlargement EB2 of that bore. Immediately above the packing ring 17 there is a shallow but long annular groove 18 extending about the valve EV to provide a space into which the pressure fluid may enter, the flange 19 between the upper end of the groove 18 and the extreme upper end of the valve EV being milled away as indicated best in Fig. 6 at 20, and in Figs. 5 and 6 at 20, providing ready communication between the space above the valve EV and the groove 18.

Thus if the main valves CV, DV, etc., are to be of the normally closed type, and is illustrated herein, these valves are held in their normally closed positions merely by permitting the pressure fluid to exert its force upon the upper end of each of these valves and to fill and maintain such pressure within the groove 18. By reason of the difference in the area between the upper end of each of these valves and that area which is exposed to the lowermost or reduced diameter portion of each of the valve bores, the pressure times area differential will always act to keep the valves closed. Likewise, it is apparent that to open the main valves all that is necessary is to relieve the force of the pressure fluid from above the main valves and the forces then exerted upon the chamfered end of the valves will cause them to rise within their bores.

Figure 9:
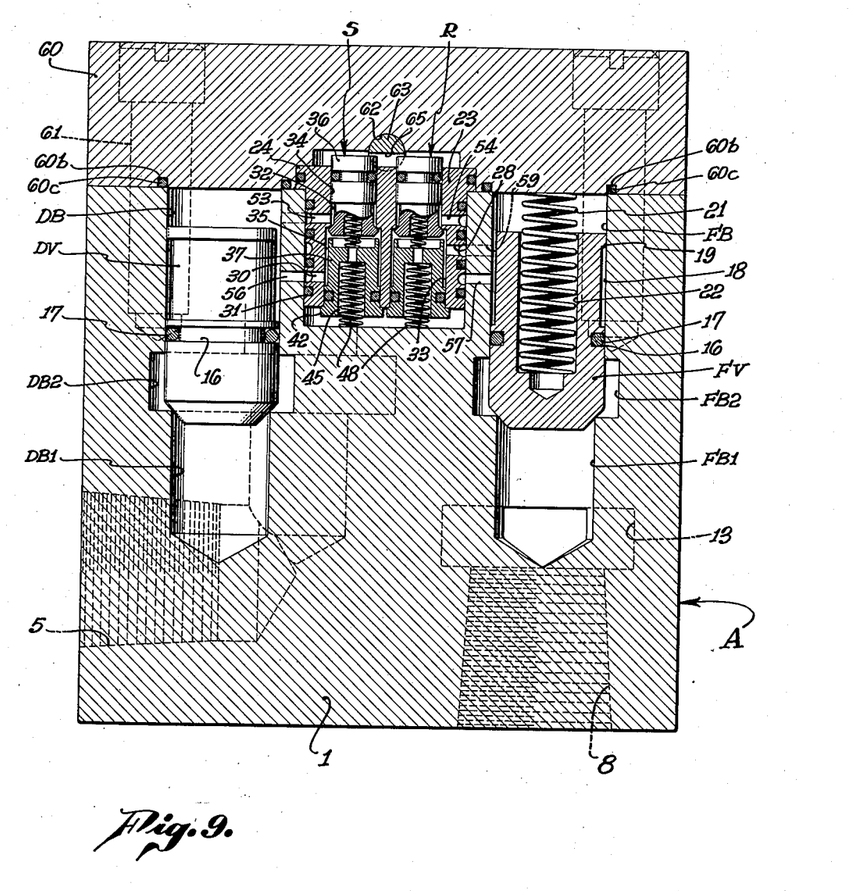
Fig. 9 is a vertical sectional view taken along line IX—IX of Fig. 2.

While, as pointed out, the difference in the areas of the valve portions which are exposed to the fluid pressures will under ordinary conditions be sufficient to maintain the valves in their closed position and to urge them toward their closed positions whenever the fluid pressure is exerted upon the upper portions of the valves without the necessity of utilizing any additional spring forces, it may be desirable as a matter of safety or precaution to provide those two valves CV and FV, which are normally exposed to the pressure bore PB, with the biasing springs 21 which may be, as illustrated in Figs. 5 and 9, merely helical springs disposed in a central counter-bore 22 extending from the upper end of each of the main valves CV, FV, etc.

Since the valves are preferably to be identical in structure, all of the bores are preferably bored but springs are located only in the two valves CV and FV. The valves DV and EV, when closed, having their lower portions exposed only to the static forces of the static liquid in the cylinder K, need not be provided with springs but can be urged toward their closed positions merely by the application of fluid pressure to the upper ends of the valves.

To cause the selective lifting of the main valves FV and DV, when it is desired for the piston rod L to be moved outwardly of the cylinder K, it is only necessary to relieve the normal fluid pressure upon the upper ends of these two valves while fluid pressure is maintained upon the upper ends of the remaining two valves CV and EV. Likewise to cause fluid to flow in the opposite direction to the cylinder K, it is only necessary to relieve the fluid pressure upon the upper ends of the valves CV and EV while maintaining the fluid pressure upon the upper ends of the valves DV and FV. To accomplish this selective control, there is utilized a pilot valve structure illustrated particularly in Figs. 2, 4 and 9 through 12.

By referring particularly to Fig. 2, it will be observed that the various bores PB, RB, CB, DB, EB and FB are arranged about a central pilot valve bore PVB which extends (see Fig. 4) from the same top surface of the body 1 as do the remainder of the bores but in the case of the pilot valve bore, the bore extends only a relatively short distance into the metal of the body 1.

The pilot valve structure comprises a pilot valve body 23 which is preferably formed from a cylindrical piece of metal, the upper end of which is formed with an enlarged head 24, the valve body having a reduced diameter portion which extends into and fits within the pilot valve bore PVB but does not quite reach the bottom of the pilot valve bore. Intermediate the upper end of the pilot valve bore and the bottom of the pilot valve body, the surface of the body is formed with a plurality of grooves 25, 26, 27, 28, 29, 30 and 31 which for convenience in manufacture may be of identical shape and dimensions, the uppermost of these grooves 25 being a packing groove in which is disposed a donut packing ring 25a, the function of which is that of a sealing ring as was described with reference to the packing ring 17 for each of the main valves.

Likewise alternate grooves 27, 29 and 31 are provided with packing rings sealing the remaining alternate grooves 26, 28 and 30 from intercommunication with each other. Thus the pilot valve body may be readily formed as a separate unit with its packing rings associated therewith and then be merely pressed into the pivot valve bore PVB with assurance that each of the grooves 26, 28 and 30 will be isolated from each other.

As will be most readily observed from an inspection of Fig. 9, a pair of pilot valve chambers 32 and 33 are formed through the pilot valve body 23, each of the chambers comprising an upper bore 34 and a lower bore 35, the lower bore being of slightly greater diameter than that of the upper bore, the two chambers 32 and 33 extending parallel to each other, one disposed upon each side of the vertical center of the pilot valve body 23. In each of the bores is a pilot valve structure which preferably comprises an upper pilot valve member 36 and a lower pilot valve member 37. The upper pilot valve member 36 (see Figs. 9 and 10) is formed as a cylindrical member having a valve head 38 formed upon its lower end of a diameter in excess of the diameter of the upper portion 34 of the chamber 32 while immediately above the head is an annular groove 39 providing a fluid passage about the valve member 36. Immediately above the groove 39 the valve is formed with a cylindrical surface having a diameter fitting the diameter of the upper portion 34 of the chamber 32, a packing ring 40 being disposed in a groove 41 to seal against the leakage of fluid from the valve member 36 to the exterior of the pilot valve body 23.

The lower pilot valve member 37 is formed with an enlarged head 42 adapted to abut the lower surface of the pilot valve body 23, a packing ring 43 being provided immediately above the head 42 to sealingly engage the larger lower portion 35 of the chamber 32 to seal against inadvertent leakage of fluid downwardly past the valve member 37. Immediately above the packing ring 43 the diameter of the valve member 37 is reduced to provide a fluid passage about this member to permit the ready passage of fluid upwardly and downwardly alongside this valve member. The upper end of the lower pilot valve member 37 is counter-bored as indicated at 44, leaving an upstanding flange which constitutes a seat against which lower chamfered surface of the head 38 formed upon the upper valve member 36 may seal. Thus if fluid pressure from the source is permitted to flow into the lower end of the pilot valve bore PVB, such fluid may then flow upwardly through a central counter-bore 45 in the lower valve member 37 into the counter-bore 44 and outwardly between the valve members 36 and 37 and about the exterior surface of the lower valve member 37 and into communication with a port 46 which communicates the chamber 32 with the lowermost free groove 30 on the exterior surface of the pilot valve body 23. Also such fluid pressure will push upwardly upon the lower end of the upper pilot valve member 36, causing the upper chamfered surface of the head 38 to seal upon the shoulder 47 formed between the two different diameter bores forming the chamber 32.

To overcome the slight friction which may be occasioned by reason of the bearing of the packing rings 40 and 43 upon the chamber surfaces, it is preferred to normally urge the lower pilot valve member upwardly by means of a spring 48 which has one of its ends bearing upon the lower surface of the pilot valve bore PVB and its upper end extending into the counter-bore 45. Similarly the uppermost valve member 36 is normally urged into seating relation with its seat 47 by means of a spring 49, one end of which bears upon the lower member 37 and the other member extends into a counter-bore formed in the upper end of the lower valve member 36.

The other pilot valve is of identical construction and need not be re-described though for purposes of convenience for the following description the pilot valve assembly which has been described in detail will be referred to as pilot valve R while the other pilot valve assembly will be referred to as the pilot valve S. It will be noted, however, that fluid pressure applied to the underneath surface of the pilot valve S will flow upwardly through the interior of the member 37 of this valve and out through the space between the upper member 36 and the lower member 37 and about the reduced diameter portion of the member 37 and through a port 50 into communication with the intermediate free groove 28 of the pilot valve body 23 while at the same time the fluid pressure will be applied to the underneath side of the upper valve member 36, maintaining this valve closed against its seating surface in the pilot valve body 23.

It will also be observed that the uppermost free groove 26 of the pilot valve body is at all times communicated with the grooves 39 in the upper valve members 36 of both of the pilot valves R and S.

Figure 4:
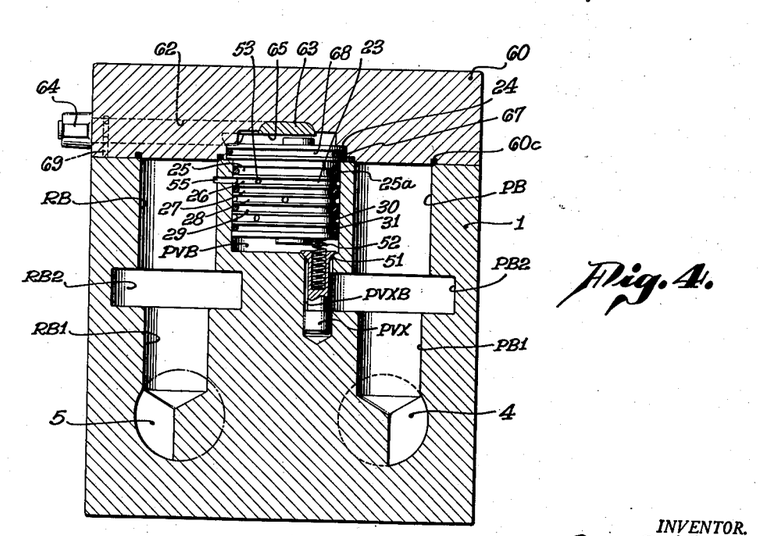
Fig. 4 is a vertical sectional view taken along the line IV—IV of Fig. 2.
Figure 10:
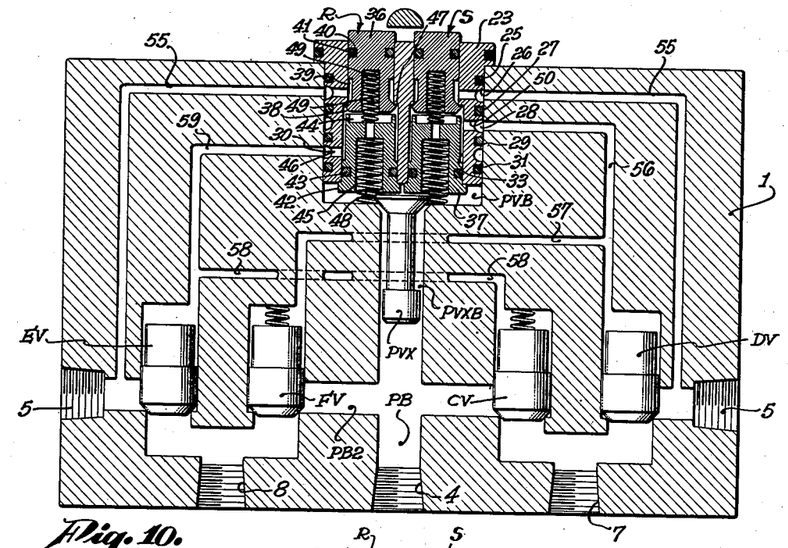
Fig. 10 is a schematic view of the valve structure illustrated in Figs. 1 through 9 and illustrating diagrammatically the relative positions of the parts when the valve is idle.

To maintain the pilot valves in their normal positions as shown in Figs. 9 and 10, fluid pressure from the source is constantly applied thereto, preferably through the medium of a pilot valve check valve PVX, the location and construction of which is best illustrated in Fig. 4 wherein this check valve is illustrated as a cylindrical valve member extending into a vertical bore PVXB which in turn extends from the bottom of the pilot valve bore PVB downwardly past the enlargement PB2 of the pressure bore PB.

The pilot valve PVX has a valve head 51 adapted to seat upon the shoulder formed by the junction of the lower end of the pilot valve bore PVB and the check valve bore PVXB. The intersection of the check bore PVXB with the enlargement PB2 exposes the bore PVXB constantly to the pressure from the pressure supply line so that liquid will flow into the pilot valve bore PVB until the pressure therein is equal to the pressure of the supply line, whereupon the check valve will close, aided by means of a spring 52, which extends into a counter-bore in the pilot valve PVX and has its upper end bearing against the lower end of the pilot valve body 23.

Also whenever liquid is allowed to flow through the pilot valve assembly, the reduction in pressure in the pilot valve bore PVB will allow the check valve to open to replenish this supply so that at all times a pressure is maintained on the pilot valve assembly equal to the pressure in the supply line. Further, in the event the supply line should break or the pressure in the supply line should otherwise be reduced, the check valve will act to maintain a relatively high pressure within the pilot valve assembly and above each of the main valves so as to insure that these valves will remain closed. Thus reduction or loss of pressure in the supply line will not result in any movement or change of position of the piston rod L, the check valve acting as a safety device to maintain the positions of the apparatus controlled by the valve structure until the supply pressure has been restored.

By referring particularly to Figs. 2, 4 and 9, it will be observed that the port 46 in the pilot valve body 23 which communicates between the pilot valve R and the annular groove 30 is at a lower level than the port 50 which communicates with the pilot valve S. Also, it will be observed that the groove 26 on the pilot valve body is provided with two ports 53 and 54 which communicate between the groove 26 and each of the pilot valves R and S, respectively, at a still higher level, the communication with the pilot valves being above the seats 47 for the uppermost element of each of these pilot valves.

It will also be observed that by reason of the location of the grooves 26, 28 and 30 at the successively higher levels, intercommunication between them and the respective main valve bores may readily be accomplished merely by forming a cut laterally through the material of the valve body 1 to intersect the respective valve bores.

By referring to Figs. 2 and 4, it will be noted that the return bore RB is intercommunicated with the uppermost groove 26 of the pilot valve body by means of a passageway 55 which may be formed as a milled cut extended from the pilot valve bore toward and into the return bore RB, such milling cut being made by a suitable narrow circular milling cutter or in any other desired manner.

Likewise, by referring to Figs. 2 and 9, it will be observed that the main valve bore DB intercommunicates with the lowermost of the grooves 30 in the pilot valve body by means of a milled passageway 56 while on the diametrically opposite side of the pilot valve bore a corresponding milled cut 57 at the same level intercommunicates this same groove 30 with the main valve bore FB.

By forming diametrically opposite milling cuts 58 and 59 at the intermediate level, the main valve bores CB and EB are communicated with the intermediate level groove 28.

The construction of the pilot valve assembly as hereinbefore described is such that it, like the main valve body 1 and the main valves CV, DV, etc., can be constructed entirely by engine lathe operations or screw machine or turret lathe operations since each of the parts is cylindrical in shape, requiring the use of no other tools.

Figure 11:
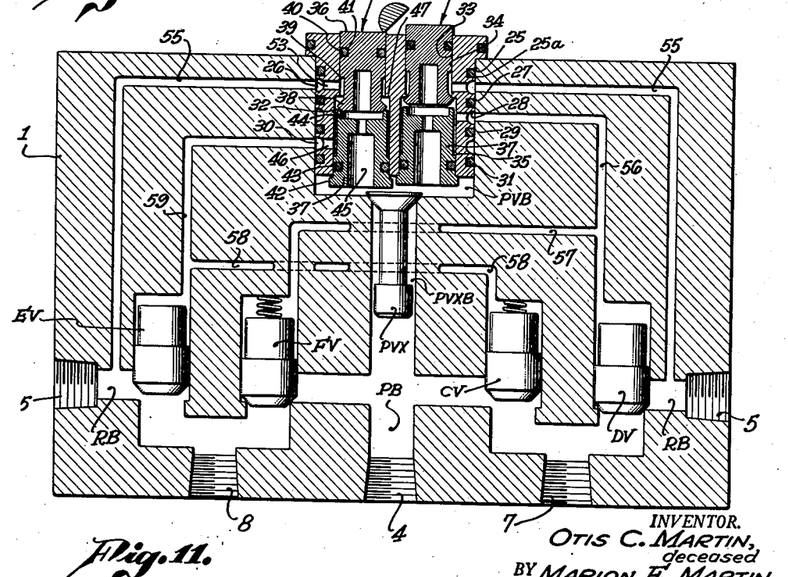
Fig. 11 is a schematic view similar to Fig. 10 and illustrating the relative positions of the parts when the valve is actuated to cause fluid to flow in one direction through the fluid system illustrated in Fig. 1.
Figures 12, 13:
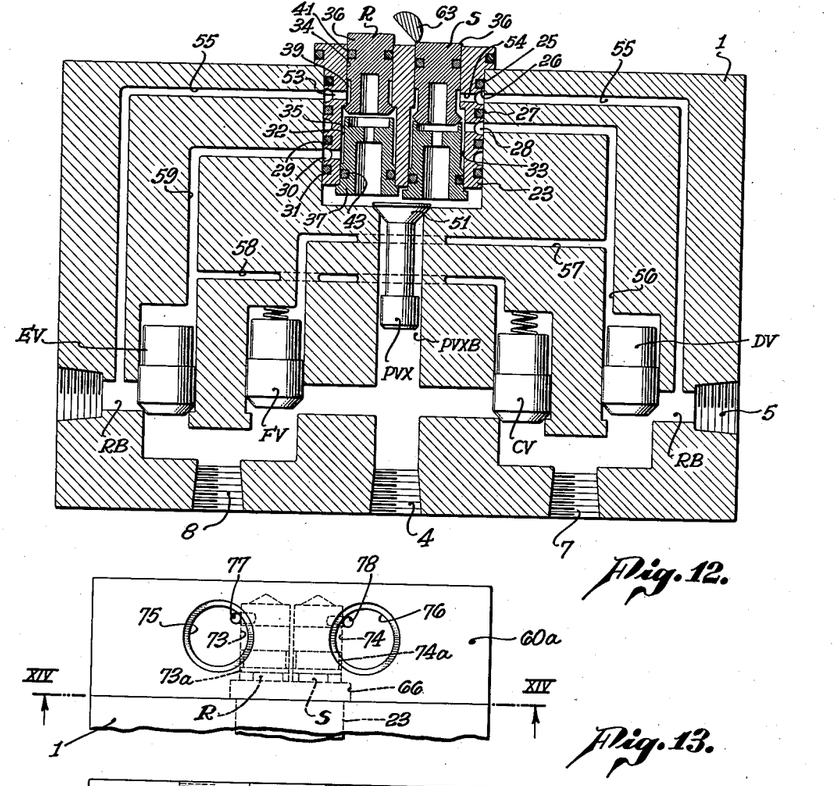
Fig. 12 is a schematic view similar to Fig. 10 and illustrating the relative positions of the parts when the valve is actuated to cause fluid to flow in the direction opposite to that shown in Fig. 11.
Fig. 13 is a fragmentary front elevational view of a cap or control unit which may be applied to the valve body illustrated in Figs. 1 through 9 in substitution for the manually actuatable unit shown in Fig. 1.

With the main and pilot valve constructions thus far described, the complete operation of the valve structure as a four-way valve may be best understood by referring to the diagrammatic operational Figs. 10, 11 and 12. The valve body 1 is diagrammatically illustrated as being provided with the pressure inlet port 4, the two cylinder ports 7 and 8 and two return ports 5, one at each side of the body 1. It will be understood that this is merely a convenient representation of the single return port 5 in the actual valve construction since the radial construction has been split at port 5 and developed as a planar valve arrangement for purposes of exposition. Likewise the milled cuts 53, 56, 57, 58 and 59 are represented by elongated passages leading from the proper level of the pilot valve bore PVB to the respective bores with which these cuts communicate.

In Fig. 10 the position of all of the active parts of the valve structure are shown in their normal non-operated positions, that is, when all of the main valves are closed and the cylinder and piston mechanism is at rest. In this position the liquid entering the pressure port 4 passes to the pressure bore PB and thence by way of the enlargement PB2 to the main valves CV and FV. Likewise this liquid communicates through the pilot valve check bore PVXB and through the pilot valve PVX to the pilot valve bore PVB and thus to the under side of the pilot valve assemblies R and S. With the pilot valve assemblies R and S in their normal position, as shown in Fig. 10, the effect of the fluid pressure in the pilot valve bore PVB will be to hold the upper valve members 36 of each of these valve assemblies in their uppermost or closed positions. Thus the fluid pressure passing up through the lower pilot valve member 37 will pass outwardly through the port 50 into the annular space defined by the groove 28 and thence by way of the milled cut 56 to the upper end of the main valve DV, applying fluid pressure above this valve, holding it closed against its seat. At the same time the fluid pressure will pass through the diametrically opposed milled cut 57 to the upper side of the main valve FV, holding this valve in its closed position. Likewise the liquid passing up through the lower valve member of the valve assembly R will hold the upper valve member of this assembly in its closed position while the fluid pressure will pass through the port 46 into the annular space provided by the groove 30, from whence such fluid pressure will pass through the milled cut 59 to the upper side of the main valve EV, holding this valve in its closed position while at the same time such fluid pressure will pass through the diametrically opposed milled cut 58 to the upper side of the main valve CV, holding this valve closed.

Thus all of the valves are held closed by the fluid pressure upon their upper ends and no fluid will be permitted to flow through either of the cylinder ports 7 and 8 nor will fluid be directed to flow from the cylinder K back through the cylinder ports to the exhaust or return ports 5.

Now if it is desired to pass the fluid in one direction through the port 8 and in the opposite direction through the port 7, the pilot valve assembly R may be actuated to the position shown in Fig. 11, whereupon all of the parts will assume the positions diagrammatically illustrated in that figure. The depression of the upper valve member 36 of the pilot valve assembly R will cause the upper valve member to leave its seat 47 and thus permit the fluid pressure which has been exerted upon the upper ends of main valves EV and CV to be relieved, the liquid above these valves being permitted to escape back through the milled cuts 58 and 59 to the annular space provided by the groove 30 in the pilot valve body, and thence upwardly alongside the lower valve member 37, past the upper valve member and outwardly through the port 53 and the annular groove 26 of the pilot valve body, and thence through the milled cut 55 to the return bore RB and to the return port 5, and thence to the return or exhaust line 3.

Release of pressure upon the upper sides of the valves EV and CV permits these valves to be pressed upwardly by reason of the pressure of the pressure fluid exerted upon the lower sides of the valves, the valve CV being lifted from its seat by reason of the fact that the fluid pressure from the pressure source passing through the pressure bore PB is applied to the under side of the valve CV and will lift the same as soon as pressure above this valve has been relieved. Thus the valve CV rises from its seat and permits the flow of the pressure fluid from the pressure bore PB through valve bore CB and thence through the cylinder port 7, pressing the piston rod L toward the left as viewed in Fig. 1. The fluid on the opposite side of the piston is thus urged outwardly through the pipe N and into the cylinder port 8 where it presses upwardly on both of the main valves EV and FV. The valve FV, having the full fluid pressure upon its upper side as well as the lower side, will remain on its seat while the valve EV, having the pressure on its upper side relieved, will rise on its seat and permit the flow of the fluid from the cylinder K to pass to the return bore RB and through the return port 5 and return line 3. Thus the piston rod L will be moved toward the left, as viewed in Fig. 1, until it has reached a desired position, whereupon release of the pilot valve R will cause the pilot valve to close upon its seat 47 and the pressure of the pressure fluid is again built up above the valves EV and CV, forcing them down upon their seats and stopping the further flow of fluid to and from the cylinder M.

Likewise, if it is desired to move the piston rod L in the opposite direction, direction of the valve assembly S will cause such a reverse operation as illustrated in Fig. 12, wherein the fluid pressure from the source entering through the pressure port 4 and upwardly past the check valve PVX will, as hereinbefore described, hold all of the main valves in their closed position but depression of the pilot valve assembly S will open the passageway past the upper valve member 36 of this assembly and thus permit the fluid pressure which has been exerted upon the main valves EV and FV to be relieved, the pressure upon the upper surface of these valves passing through the milled cuts 56 and 57 to the annular groove 28 and thence through the pilot valve port 50 and upwardly past the upper pilot valve member 36 and outwardly through the pilot valve port 54, and through the milled cut 55 to the return bore RB and the return port 5 and thence to the return or exhaust line 3.

The fluid pressure from the source which has been impinging upon the lower sides of the valves FV and DV will therefore cause these valves to rise. The fluid pressure passing through the pressure port 4 and to the under side of the main valve FV will thence pass through the now open valve and into and through the cylinder port 8 to apply fluid pressure to the left-hand end of the piston in the cylinder K, urging the piston rod L toward the right while at the same time the fluid upon the opposite side of the piston will be forced outwardly through the pipe M and into the cylinder port 7 and thence past the now open valve EV through the return bore RB to the return line 3.

Again when the desired amount of motion in that direction has been achieved, release of the pilot valve assembly S will permit the pilot valve structure to close, thus restoring the pressure to the upper side of the main valves FV and DV, closing these valves while at the same time the main valves CV and EV will remain closed and further movement of the piston rod L is arrested.

It will be observed therefore that a relatively minute amount of movement of the pilot valve assemblies R and S is required for the operation of the main valves controlled by them and that the use of merely two pilot valves will cause the selective simultaneous operation of their associated main valves, namely, the operation of the pilot valve assembly R will instantly control the movement of the main valves EV and CV while movement of the valve assembly S will control instantly the movement of the main valves FV and DV.

While it has been illustrated and described in the foregoing the adaptation of the valve structure to a normally closed type of valve wherein the main valves CV, DV, etc. are normally held in their closed positions, it will be apparent that the same arrangement may be utilized for a control, wherein it is desired that the main valves be in normally open position and merely moved to closed positions as the valves are operated, the only distinction being that the pilot valves shall operate to normally expose the upper surfaces of all of the valves to the return line except when one or the other of the pilot valve assemblies is depressed and merely requires the reversal of the pilot valve assemblies.

Likewise it will be observed that while the foregoing description has been concerned with a four-way valve structure, it will be equally apparent that one of the pilot valve assemblies and a single one of the main valves may be utilized for a two-way valve application wherein the valve is to be either opened or closed selectively upon the operation of the pilot valve. Likewise it will be apparent that the adaptation of the system of the present invention to a three-way valve arrangement may be readily accomplished by utilizing the two pilot valve assemblies and only two of the main valves, for example, either valves CV and FV or DV and EV.

Thus it will be evident that a single valve body 1 may be made up in stock quantities, a number of main valves which are identical in construction may be made up in quantities, and a number of pilot valves and pilot valve assemblies may be made up in stock quantities and from such stock the number of pilot valves, main valves, etc. may be selected to be assembled for any of the desired operations.

Another item of interest at this point is that repairs to the valve structure may be readily made merely by pulling out a worn or defective part and the substitution of a corresponding part from a stock supply, and that the stock supply which is required has a minimum of different parts, namely, valve bodies 1, main valves, upper and lower pilot valve members, pilot valve body and a supply of packing rings for the main valves and the pilot valves. This is an item of considerable importance, both in the mass production and also in the maintenance of such valves, particularly in their application to aircraft where access to a large supply of different stock parts may be difficult.

In view of the fact that the entire operation of this valve construction depends upon the depression of one or the other of the pilot assemblies R and S through but a minute fraction of an inch necessary to open the upper pilot valve members 36, the valve structure may be controlled in any one of a number of manners, dependent upon the location of the valve with respect to its accessibility by an operator or the necessity for providing a control of the valve structure from two or more locations or the desirability of utilizing two or more types of operators for the valves such as manual and fluid pressure operations, manual and magnetic operations or any combination of these three.

The valve structure is therefore readily adapted to the use of any of these by the mere selection of one of a plurality of cap members Z to be associated with the valve body 1.

As illustrated in Figs. 1 through 12, the operation of the valve is by manual control, such control being accomplished by the utilization of a relatively thin cap member 60 having length and breadth conforming with the length and breadth of the valve body 1 so that when placed upon the valve body 1 and secured thereto by means of suitable screws 61, the cap and its operating mechanism are operatively assembled upon the body 1.

The cap member 60 is provided with a laterally extending bore 62 extending from one of its side surfaces, into which projects a valve operating rod 63 preferably of circular cross section, the outer end of which is secured to a suitable handle 64. The round stock of the rod 63 is milled or cut away substantially to the longitudinal center plane of the rod, as indicated at 65 in Fig. 7, so that the flat under surface is presented immediately above the pilot valves R and S.

Figures 6, 7:
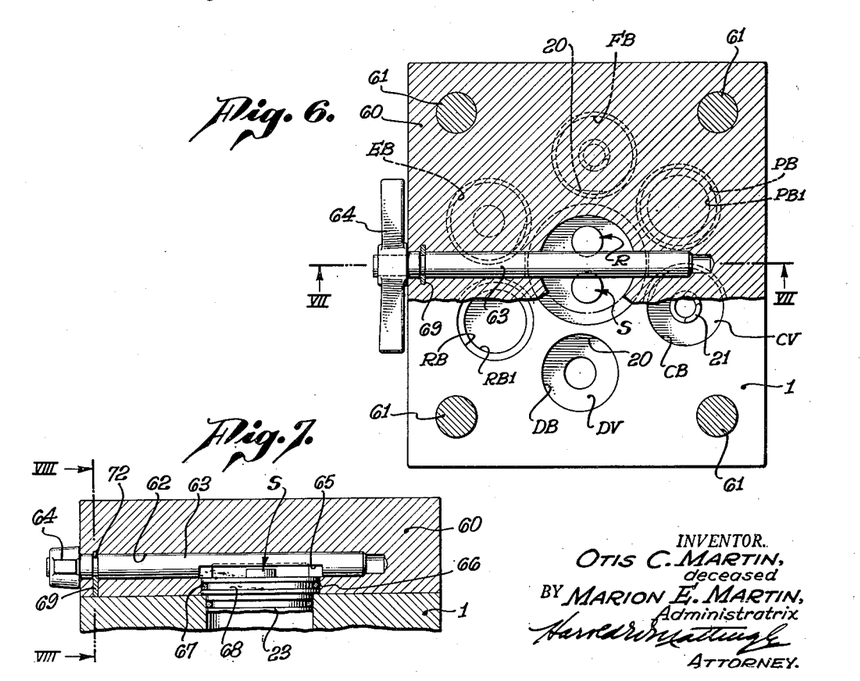
Fig. 6 is a horizontal sectional view through the cap of the valve taken along line VI—VI of Fig. 3, and illustrating a portion of the cap as broken away to disclose the upper surface of the valve body disposed beneath the same.
Fig. 7 is a vertical sectional view through the cap and a portion of the valve body taken along line VII—VII of Fig. 6.

As illustrated in Fig. 6, the disposition of the bore 62 and the operating rod 63 is such that the flat surface of the rod is disposed above both of the pilot valve assemblies R and S and, as viewed in Fig. 7, the pilot valve assemblies project upwardly above the upper surface of the pilot valve body 23 into relatively close relation with the flat surface of the rod. Thus by partially rotating the rod 63 by the handle 64 in one direction, say clockwise, the flat surface of the rod will act as a cam engaging and depressing the pilot valve assembly S while rotation of the rod in the opposite direction will cause the flat surface to engage and depress the pilot valve assembly R.

It will be observed from an inspection of Figs. 6 and 7 that the underside of the cap 60 is formed with an upwardly extending bore 66, the diameter of which is substantially equal to the diameter of the head 24 of the pilot valve body 23, this bore comprising a seat into which the head 24 of the pilot valve body extends and within which it may be sealed against leakage by means of a suitable packing ring 67 disposed in an annular groove 68 formed about the projecting head 24.

While the rod 63 may be retained within its bore in any suitable manner, one simple form of retention is illustrated in Figs. 6, 7 and 8 as comprising a relatively thin shim 69 adapted to be pressed into a milled cut 70 extending from the lower surface of the cap 60, the shim having a slot 71 therein adapted to pass about the shaft 63 at a reduced portion thereof such as may be formed by cutting an annular groove 72 about the shaft. Thus the shim 69 may make a pressed fit in its cut and when the cap 60 is in place upon the valve body 1 the inadvertent displacement of the shim will be effectively prevented.

By referring particularly to Figs. 3, 4, 5 and 9, it will be noted that leakage of fluid between the valve body 1 and the cap 60 may be readily prevented by forming on the under surface of the cap 60 annular grooves 60b, one for each of the bores PB, RB, CB, etc., in the valve body 1, each of such grooves being concentric with but slightly larger in diameter than the diameter of the upper ends of each of these bores so that by employing a packing ring 60c in each of these grooves not only is the cap effectively sealed upon the body 1 but also each of the bores PB, RB, etc. are effectively sealed against leakage between each other past the meeting face of the cap 60.

Figure 14:
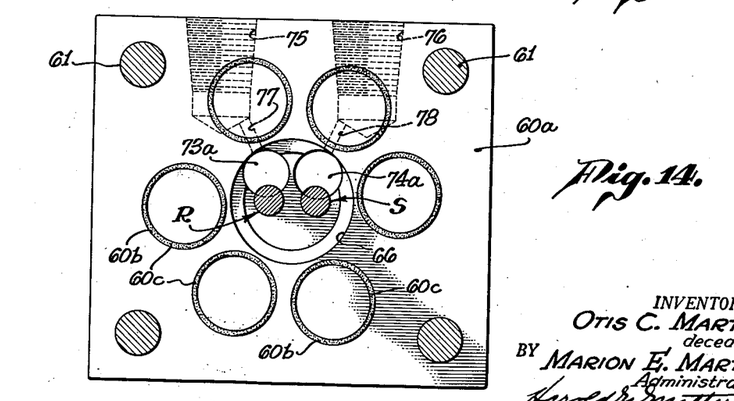
Fig. 14 is a bottom plan view of the control unit shown in Fig. 13.
Figure 15:
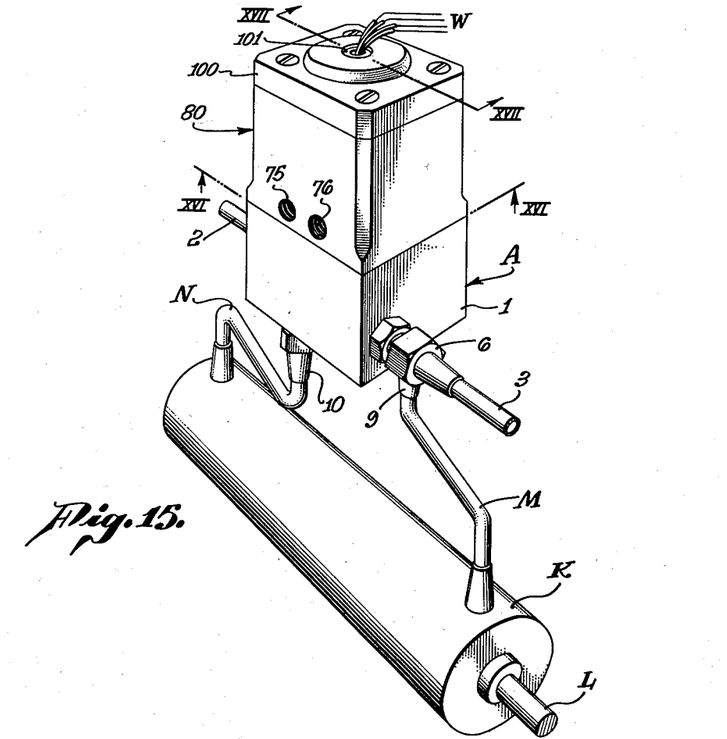
Fig. 15 is a perspective view similar to Fig. 1 but illustrating the valve unit as having associated therewith a control unit including both a hydraulic actuator and a magnetic actuator for the valve.

To adapt the valve structure hereinbefore described for other operations, such as a pneumatic or hydraulic actuation of the pilot valves R and S, a cap 60a may be substituted for the cap 60, as illustrated particularly in Figs. 13 and 14. The cap 60a, like the cap 60, comprises a relatively thin block of metal, the length and breadth of which conforms with the length and breadth of the valve body 1 and to which it may be secured by means of screws 61. From the under side of the cap 60a there is formed a shallow bore 66 for the reception of the head of the pilot valve body 23 while from this bore 66 there extends a pair of upwardly directed parallel bores 73 and 74, these bores extending on the guide to the upper surface of the cap 60a. In each of the bores 73 and 74 there is located a relatively short piston 73a and 74a, respectively, the lower ends of the pistons projecting through the lower ends of the bores 73 and 74 to rest upon the upper ends of the pilot valve assemblies R and S.

Extending laterally from one face of the cap 60a is a pair of threaded bores 75 and 76, each adapted to receive a threaded pipe fitting which may be coupled to a pair of hydraulic or pneumatic control tubes (not shown) extending to any desired locations remote from the location of the valve structure. From the bore 75 to the upper end of the piston bore 73 there extends a port 77 while a similar port 78 extends from the bore 76 to the upper end of the piston bore 75. Thus by applying pressure to the pipe line leading to the fitting bore 75, pressure is exerted upon the upper side of the piston 73a, depressing this piston and causing corresponding depression of the pilot valve assembly R, with the resultant operation of the main valves in the same manner as was described for the manual operation of the pilot valve R. Similarly, exertion of fluid pressure through the fitting bore 75 will cause the piston 74a to move downwardly, depressing the pilot valve assembly S to cause a reverse operation of the mechanism to be controlled by the valve structure.

The particular control structure for exerting the fluid pressure upon either of the pistons 73a or 74a may be of any selected type such as a manually controlled push button or a remotely controlled pair of valves in the pipe lines leading to the fitting bores 75 and 76, as will be readily understood by those skilled in this art. In view of the fact, however, that the amount of movement which is required of the pilot valve assemblies R and S for successful operation of this valve structure, it will be apparent that a relatively minute amount of fluid is actually required to be transferred through the pipe lines in order to cause a movement of the fluid actuated pistons 73a and 74a. This permits pipe lines of relatively small diameter to be extended to the remote locations, a feature which is of particular importance in the adaptation of this valve structure to aircraft in view of the fact that minute pipes of very little weight may be employed to extend the point of control of the valve structure to any desired remote location upon the aircraft.

It may be desirable to provide a remotely controlled electric control apparatus for actuating the pilot valve assemblies R and S, one form of which is illustrated in Figs. 15 through 20, which electrical or magnetic control may be utilized independently of or in combination with a hydraulic control such as that just described and the combination of the hydraulic and magnetic controls are illustrated in Figs. 15 through 20, though it will be understood by those skilled in this art that the hydraulic control may be readily omitted from the structure or while the apparatus therefor may be included in the structure it does not have to be employed but may be plugged off, if desired.

In Figs. 15 through 20 there is illustrated as one form of such electrical control a cap member 80 which may be substituted for the manual control cap member 60 illustrated in Fig. 1, the cap member 80 having a length and breadth conforming with the length and breadth of the valve body block A and having a height sufficient to enclose a pair of electro-magnets 81 and 82 (see Fig. 17), each of which is adapted to operate one of the pilot valves R or S.

In view of the fact that the actual amount of movement which is required of the pilot valves R and S, the electro-magnets may be so constructed as to provide only a few thousandths of an inch movement of the armature or movable part of the magnetic structure and also since the pilot valve only is to be operated by the electro-magnet instead of the main valves proper, a relatively small amount of force is required to be exerted by the electro-magnets.

Figure 17:
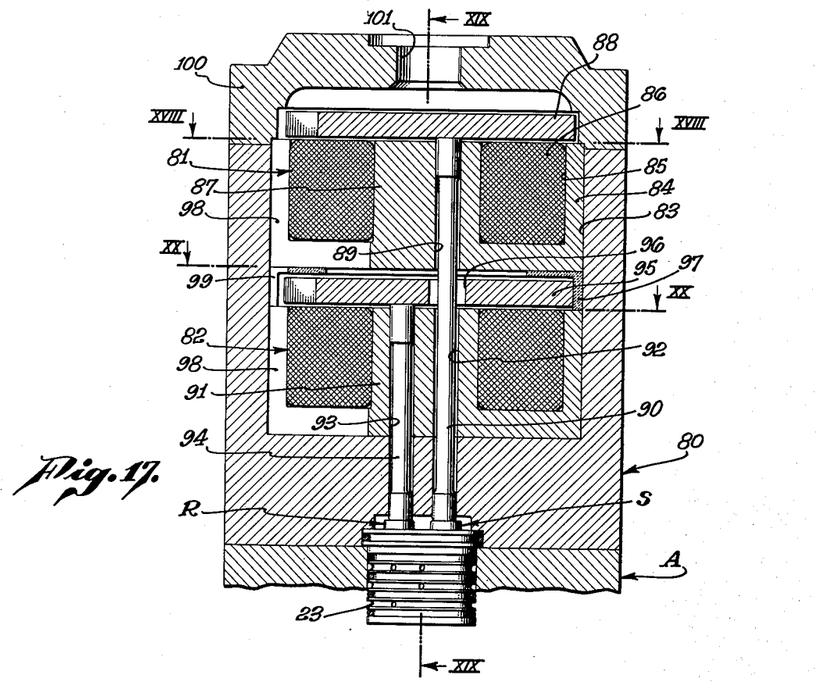
Fig. 17 is a vertical sectional view taken along the plane indicated by the line XVII—XVII of Fig. 15.
Figure 18:
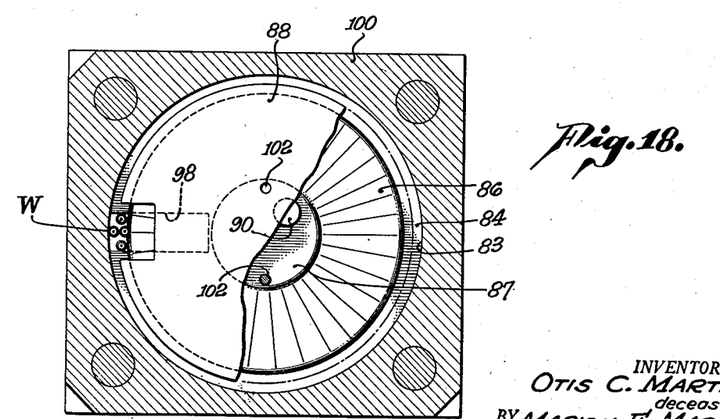
Fig. 18 is a horizontal sectional view taken along the line XVIII—XVIII of Fig. 17.

By referring to Fig. 17 it will be observed that the electrical control cap block 80 has a relatively large bore 83 extending from its upper end, into which may be assembled the electro-magnets 80 and 81. The bore 83, being circular in cross section, facilitates the construction of the electro-magnets by permitting them to be circular in cross section, again adapting the construction of the electrical portions of the valve structure by simple machining operations such as could be performed upon a lathe.

The electro-magnet 81 is constructed of a suitable iron core 84 circular in cross section and counter-bored with an annular groove 85, into which may be seated a ring-like coil 86. The central portion 87 of the core provides one leg of the magnetic path while the side walls of the core 84 provide the opposite leg so that a circular armature 88 merely laid upon the upper end of the assembled core and coil will be attracted downwardly toward the core upon the energization of the coil 86. A bore 89 extends longitudinally through the central portion of the core body in such a location as to permit its alignment with one of the pilot valves S and a metallic pin 90 extends through this bore so that when the cap 80 is assembled upon the valve body A the pin 90 will rest upon the pilot valve S and, as illustrated in Fig. 7, will hold the armature 88 in slightly spaced relation from the core 84. Then upon energization of the coil 86 the armature will be depressed against the normal upward thrust of the pilot valve S, causing the pilot valve S to be depressed in the same manner as though it had been operated by the manual control structure illustrated in Fig. 1.

The electro-magnet 82, which is disposed immediately below the electro-magnet 81, is of substantially identical construction except that the mid portion 91 of the core of this magnet is provided first with a bore 92 alignable with the bore 89 so as to permit the passage of the pin 90 therethrough and, in addition, it is provided with a second bore 93 through which extends a second pin 94 adapted to be aligned with and rest upon the opposite pilot valve R. The armature plate 95 for the magnet 82 rests upon the upper surface of the core for this magnet and is held in spaced relation, as illustrated in Fig. 17, by the upward pressure exerted by the pilot valve R until the coil 82 is energized, whereupon the pin 93 will be depressed and will actuate the pilot valve R in the same manner as if it had been operated by the manual control structure illustrated in Fig. 1. The armature plate 95 must, however, be provided with a relatively large opening 96, through which the pin 90 of the magnet 81 may extend, it being preferable that the opening 96 be sufficiently large to provide ample clearance about the body of the pin 90.

Figure 20:
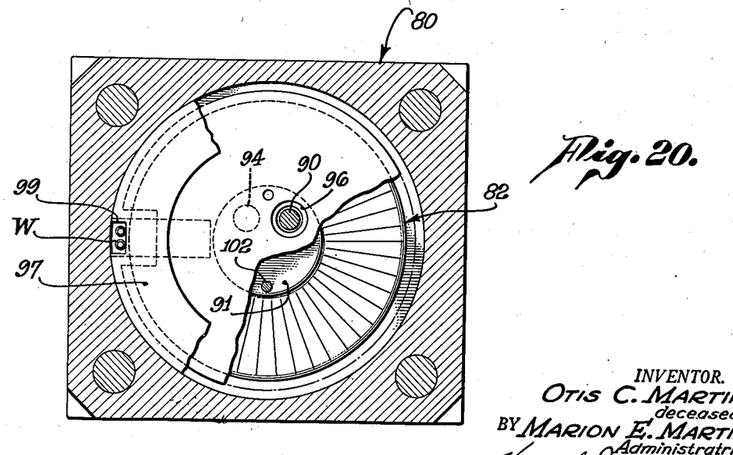
Fig. 20 is a horizontal sectional view taken along the line XX—XX of Fig. 17.

To space the two magnets 81 and 82 apart and to provide operating space for the armature 95, there is provided a spacer ring 97 of non-magnetic material, this ring being preferably formed in the shape of a cup, the side walls or flanges of which act as a spacer between the cores of the magnets 81 and 82, while the bottom of the cup acts as a supporting shelf upon which the magnet 81 may rest. Preferably the mid section of the bottom of the cup is cut out to provide ample clearance through which the pin 90 may extend and facilitate the assembly of the magnetic structure in the cap body 80. The conductor wires for the respective magnets 81 and 82 are preferably led upwardly through a slot or longitudinal groove 98 formed along one side of each of the cores of the magnets 81 and 82. A corresponding slot or notch 99 is formed in the spacer ring 97, as shown in Fig. 20. A cover 100 may be employed to cover and enclose the upper end of the magnet structure, such cover being preferably of the same length and breadth as the cap body 80 and provided with a central bore 101, through which the conductor wires W may be led to permit their connection to the control circuits.

Figure 19:
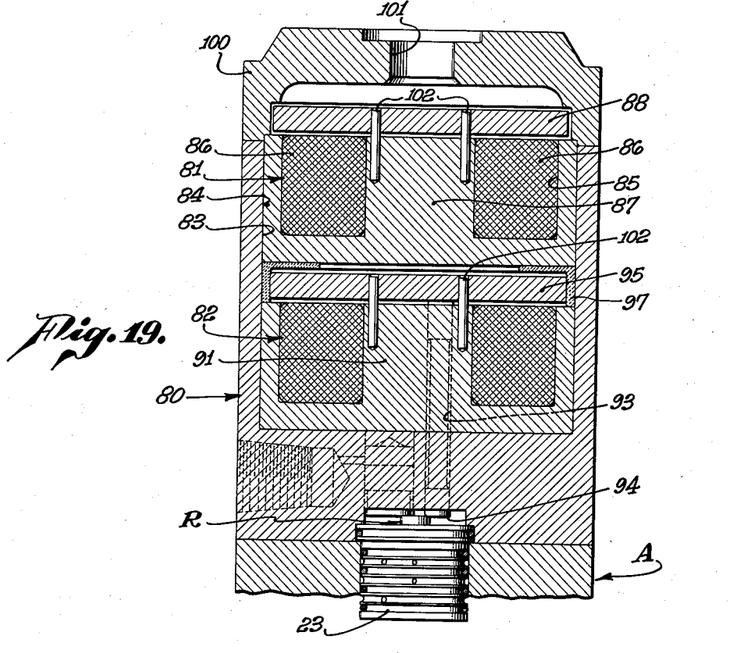
Fig. 19 is a vertical sectional view taken along the line XIX—XIX of Fig. 17.

By referring particularly to Fig. 19 it will be observed that the armatures 88 and 95 may be prevented from rotating upon their cores by means of pilot pins 102, two of these being preferably provided for each armature set into the middle portion or mid leg of the cores of the respective magnets with which they are associated. The upper or projecting ends of the pins pass through loosely fitting holes formed in the armatures. Thus the upward and downward movement of the armatures is in no wise impeded but rotation of the armatures, such as might bring the armature 95 into metallic contact with the pin 90, is effectively prevented.

Figure 16:
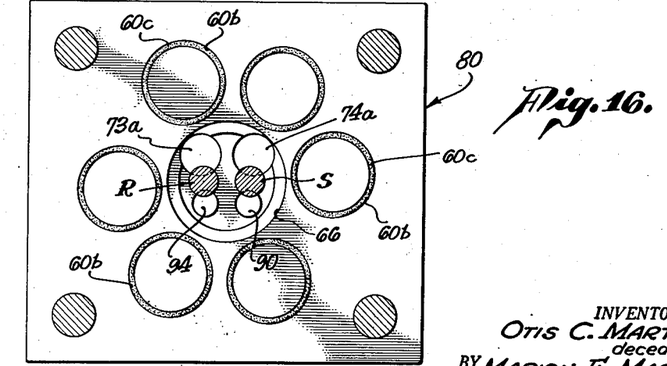
Fig. 16 is a bottom plan view of the control unit shown in Fig. 15.

As pointed out hereinbefore, the cap body 80 may have integrally formed in its lower portion a hydraulic control structure such as that illustrated in Figs. 13 and 14 without interference with the operation of the electrical control since, as will be observed from an inspection of Fig. 16, the pistons 73a and 74a engage the pilot valves R and S at one side of their centers while the operating pins 90 and 94 engage the same pilot valves on the opposite side of their centers, thus permitting the valve to be equipped with both magnetic and electrical controls. In the event of a failure of the electrical system the hydraulic control could be used or vice versa.

On the other hand, if the hydraulic structure is not desired, the body 80 may be formed without the hydraulic structure therein. Thus it will be observed that by providing a standard set of main valve bodies and pilot valve assemblies and by providing a stock of manual control caps, a stock of hydraulic control caps and a stock of either combination magnetic and hydraulic or simple magnetic control caps, any desired assembly of valve operators may be made to suit a particular application of this valve structure to a hydraulic control problem.

While there has been shown and described the preferred embodiment of the present invention, the same is not to be limited to any of the details of construction shown and described herein, except as defined in the appended claims.

What is claimed as new is:

1. In a valve structure, a valve body block having a pilot valve assembly bore extending from one surface thereof and having its axis disposed substantially centrally of said surface, a plurality of main valve bores formed in said block and disposed about said pilot valve bore, ports formed in said body, one for each of the main valve bores, the ports from the different valve bores extending to and communicating with the pilot valve bore at different levels in said bore, a pilot valve assembly comprising a pilot valve body and a plurality of pilot valves carried thereby, said assembly being insertable into the pilot valve bore, and packing rings on said pilot valve body disposed at different levels thereon and between the port levels for dividing the pilot valve bore into a plurality of chambers to prevent intercommunication between the ports extending from different main valve bores.

2. In a valve structure, a valve body block having a pilot valve assembly bore extending from one surface thereof and having its axis disposed substantially centrally of said surface, a plurality of main valve bores formed in said block and disposed about said pilot valve bore, ports formed in said body, one for each of the main valve bores, the ports from the different valve bores extending to and communicating with the pilot valve bore at different levels in said bore, a pilot valve assembly comprising a pilot valve body and a plurality of pilot valves carried thereby, said assembly being insertable into the pilot valve bore, packing rings on said pilot valve body disposed at different levels thereon and between the port levels for dividing the pilot valve bore into a plurality of chambers to prevent intercommunication between the ports extending from different main valve bores, and ports in said pilot valve body, one for each of said pilot valves, the ports from each of the pilot valves communicating with a different one of said chambers.

3. In a valve structure, a valve body block having a pilot valve assembly bore extending from one surface thereof and having its axis disposed substantially centrally of said surface, a plurality of main valve bores formed in said block and disposed about said pilot valve bore, a fluid inlet in said body through which fluid from a source of pressure may flow into said body, a pilot valve assembly insertable into said pilot valve bore and including a plurality of pilot valves for controlling the flow of fluid to the different main valve bores, a port communicating with said pilot valve bore and with the fluid inlet in said body, and a check valve interposed in said port to prevent return flow of fluid from said pilot valve bore.

4. In a valve structure, a valve body, four valve bores extending from the surface thereof into the body and each formed with a seat at an intermediate point, a cylindrical valve member fitting in each of said bores and having one end terminating in a frusto-conical portion to contact its valve seat, an inlet port in said body and adapted to be connected to a source of fluid under pressure and communicating with two of said valve bores above the valve seats, an exhaust port in said body adapted to be connected to an exhaust system and communicating with the other two of said valve bores above the valve seats, two operating ports formed in said valve body and each communicating with the bottom of one of the bores connected to pressure and the bottom of one of the bores connected to exhaust, means communicating the outer end of each of said valves to said inlet port, whereby inlet pressure seats the valves, and pilot valve means associated with said communicating means to remove inlet pressure from the outer end of a selected pair of valves including a pressure and exhaust valve and apply instead exhaust pressure, whereby the pressure on the inner end of the valves will cause the valve pair selectively to open.

5. In a valve structure, a valve body, four valve bores extending from the surface thereof into the body and each formed with a seat at an intermediate point, a cylindrical valve member fitting in each of said bores and having one end terminating in a frusto-conical portion to contact its valve seat, an inlet port formed in said body and adapted to be connected to a source of fluid under pressure and communicating with two of said valve bores above the valve seats, an exhaust port in said body adapted to be connected to an exhaust system and communicating with the other two of said valve bores above the valve seats, two operating ports formed in said valve body and each communicating with the bottom of one of the bores connected to pressure and the bottom of one connected to exhaust, a cylindrical bore in said valve body having its lower end communicating with said inlet port, a pilot valve housing disposed in said bore and having two parallel stepped bores therethrough, four ports in said pilot valve housing spaced along the housing, one disposed on either side of the stepped portion of each of said stepped bores, means connecting the outer two of said pilot housing bores to said exhaust port, conduits providing communication between each of the inner pilot housing ports and said main valves, a drilled plug inserted in the inner end of each of said stepped pilot bores having a reduced inner end to permit flow to its associated port, a movable valve element in each of said stepped bores having an enlarged head that seats on the bore step, whereby pressure fluid flows through said drilled plug and into the inner pilot housing bores to seat the main valves and is excluded from the pilot exhaust ports, and means for selectively moving said movable pilot valve elements, whereby they unseat at the bore step and thereafter close off the associated drilled valve plug communicating the main valve bores only with exhaust pressure.

6. In a pilot operated valve, a valve body adapted to retain a pilot valve having two elements movable along parallel axes, a valve cap adapted to be secured to the valve body to cover said pilot valve and having a bore parallel to the capping surface and intersecting a recess therein over the pilot valve elements, a rotatable shaft passing into said valve cap bore and having a portion flatted in the region of the pilot valve elements, and having a reduced section at another portion, a slot formed in said valve cap through said shaft bore, and a shim inserted in the slot to engage the reduced portion of the shaft to retain the shaft in the valve cap.

MARION E. MARTIN,
*Administratrix of the Estate of Otis C. Martin, Deceased.*

REFERENCES CITED

The following references are of record in the file of this patent:

UNITED STATES PATENTS

| Number | Name | Date |
| --- | --- | --- |
| 1,471,229 | Williston | Oct. 16, 1923 |
| 1,516,368 | Williston | Nov. 18, 1924 |
| 1,912,786 | Moe | June 6, 1933 |
| 2,352,629 | Griswold | July 4, 1944 |
| 2,366,883 | Tydon | Jan. 9, 1945 |
| 2,376,918 | Hughes | May 29, 1945 |
| 2,392,421 | Stephens | Jan. 8, 1946 |
| 2,392,422 | Stephens | Jan. 8, 1946 |
| 2,393,805 | Parker | Jan. 29, 1946 |
| 2,408,562 | Kehle | Oct. 1, 1946 |
| 2,413,757 | Fletcher | Jan. 7, 1947 |
| 2,435,546 | Mercier | Feb. 3, 1948 |